US012457451B2

(12) United States Patent
Yang et al.

(10) Patent No.: US 12,457,451 B2
(45) Date of Patent: Oct. 28, 2025

(54) LINEARIZER CIRCUITS AND METHODS FOR AUDIO SWITCHES

(71) Applicant: QUALCOMM Incorporated, San Diego, CA (US)

(72) Inventors: Chienchung Yang, San Diego, CA (US); Khaled Mahmoud Abdelfattah Aly, Irvine, CA (US); Vijayakumar Dhanasekaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 18/060,279

(22) Filed: Nov. 30, 2022

(65) Prior Publication Data

US 2024/0179465 A1    May 30, 2024

(51) Int. Cl.
  *H04R 5/04* (2006.01)
  *H03F 1/32* (2006.01)
  *H03F 3/185* (2006.01)

(52) U.S. Cl.
  CPC ............. *H04R 5/04* (2013.01); *H03F 1/3205* (2013.01); *H03F 3/185* (2013.01); *H04R 2420/07* (2013.01); *H04R 2420/09* (2013.01)

(58) Field of Classification Search
  CPC ........ H03F 3/68; H03F 1/0227; H03F 1/0277; H03F 1/30; H03F 1/3205; H03F 1/52; H03F 2200/03; H03F 2200/114; H03F 3/185; H03F 3/187; H03F 3/19; H03F 3/20; H03F 3/211; H03F 3/217; H03F 3/2171; H03F 3/2173; H03F 3/72; H04H 40/18; G10H 3/18; H03G 3/001; H03M 1/66; H03M 1/76; H04R 2420/07; H04R 2420/09; H04R 5/04

USPC .................... 381/112, 120, 123, 1–3; 700/94
  See application file for complete search history.

(56) References Cited

U.S. PATENT DOCUMENTS

| | | | |
|---|---|---|---|
| 5,034,699 | A | 7/1991 | Powell |
| 5,231,360 | A | 7/1993 | Storey |
| 9,871,530 | B1* | 1/2018 | La Grou ................. H03M 1/68 |
| 10,476,516 | B1 | 11/2019 | Chuai et al. |
| 10,951,227 | B1 | 3/2021 | Thinakaran |
| 2014/0218096 | A1 | 8/2014 | Nicollini et al. |
| 2018/0270593 | A1 | 9/2018 | Taylor et al. |
| 2021/0226592 | A1* | 7/2021 | Holzmann ............ H03F 3/2173 |
| 2021/0265592 | A1* | 8/2021 | Xu ............................. G09F 9/30 |
| 2022/0376679 | A1 | 11/2022 | Huang et al. |

(Continued)

OTHER PUBLICATIONS

International Search Report and Written Opinion—PCT/US2023/081007—ISA/EPO—Mar. 15, 2024.

(Continued)

*Primary Examiner* — Lun-See Lao
(74) *Attorney, Agent, or Firm* — Loza & Loza, LLP

(57) ABSTRACT

A wireless device may include a plug that is shared by high speed data, analog audio signals, and power. Switches may be included on wires between the plug and the circuits that provide the high-speed data, analog audio signals and power to isolate those circuits from overvoltage conditions. Linearizer circuits may be included to provide gate driving signals to the switches, e.g., during transmission of analog audio signals. The linearizer circuits may include digital-to-analog converters to apply a gain factor to analog audio signals.

17 Claims, 9 Drawing Sheets

(56) References Cited

U.S. PATENT DOCUMENTS

2022/0376730 A1* 11/2022 Yadav ..................... H04B 1/40

OTHER PUBLICATIONS

Joshi S., et al., "Design and Development of Non-Linearly Controlled Class-D Audio Amplifier", Electronics, vol. 11, No. 77, Dec. 27, 2021, pp. 1-21.

* cited by examiner

LINEARIZER CIRCUITS AND METHODS FOR AUDIO SWITCHES

TECHNICAL FIELD

This application relates to linearizers, and more particularly to linearizing operation of switches on audio signal lines.

BACKGROUND

A wireless communication device is generally a small form factor device among other small form factor devices, such as tablet devices. Due to the small configuration of such devices, using the device space economically is of particular interests. In this regard, it may be desirable to convert an audio path (e.g., to a headset or speakers) on a wireless communication device from a 3.5-millimeter (mm) jack to a Universal Serial Bus (USB) version C (USB-C) port connector, as the USB-C port connector is more versatile (e.g., transmits audio, exchanges USB data, exchanges battery charger data, etc.).

Because of the additional functionality of providing audio over USB-C, the differential transmission data lines DP/DN associated with the host USB-C circuit are loaded with many components, such as switching devices coupling the differential transmission lines DP/DN to audio circuitry and other circuitry. Some current designs aim to protect the circuitry from overvoltage conditions by implementing large transistors to isolate the circuitry from the USB-C plug.

There is a need in the art for improved linearization of transistors, such as the large transistors used to isolate the circuitry, when such transistors are turned on and support transmission of audio signals.

SUMMARY

In one implementation, a wireless communication device includes an application processor; a first audio signal amplifier; multiplexing circuitry configured to couple the application processor and the first audio signal amplifier to a set of wires; a data and audio plug coupled to the set of wires; a first metal oxide semiconductor field effect transistor (MOSFET) switch disposed on a first wire of the set of wires between the first audio signal amplifier and the data and audio plug; and a first gate driving circuit having an output coupled to a gate of the first MOSFET switch, the first gate driving circuit including a first buffer having a first buffer input coupled to an output of the first audio signal amplifier through a first digital-to-analog converter (DAC).

In another implementation, a method for operating wireless communication device having a first metal oxide semiconductor (MOSFET) switch implemented between a first audio signal amplifier and an audio load. The method includes isolating the first audio signal amplifier from the audio load, including applying a first gate control signal to the first MOSFET switch at a first voltage level that turns off the first MOSFET switch; and linearizing the first MOSFET switch, including applying the first gate control signal to the first MOSFET switch at a second voltage level during an on state of the first MOSFET switch, where linearizing the first MOSFET switch includes applying an output of the first audio signal amplifier as a reference voltage to a first digital-to-analog converter (DAC), where the first DAC applies a first gain level to the output of the first audio signal amplifier, and where a first amplifier receives the output of the first audio signal amplifier at the first gain level, and where the first amplifier outputs the first gate control signal to the first MOSFET switch.

In another implementation, a wireless communication device includes means for running an operating system; means for amplifying analog audio signals; means for coupling the means for running the operating system and the means for amplifying analog audio signals to a set of wires; a data and audio plug coupled to the set of wires; a first transistor coupled between the data and audio plug and the means for amplifying analog audio signals; and means for linearizing operation of the first transistor, the means for linearizing operation of the first transistor including a first digital to analog converter (DAC) configured to receive a first audio signal from the means for amplifying analog audio signals and outputting the first audio signal having a first gain level to a first amplifier, where the first amplifier is coupled to a gate of the first transistor.

In yet another implementation, a wireless communication device includes an application processor; a pair of audio signal amplifiers corresponding to a first audio channel and a second audio channel; a coder decoder (codec) chip having multiplexing circuitry configured to couple the application processor and the pair of audio signal amplifiers to a set of wires; a plug coupled to the set of wires; a first switch coupled between the application processor and the plug on a first wire of the set of wires; and a first gate driving circuit having an output coupled to a gate of the first switch, the first gate driving circuit including a first buffer having a first buffer input coupled to the first audio channel through a first digital-to-analog converter (DAC).

These and additional advantages may be better appreciated through the following detailed description.

Figure 1:
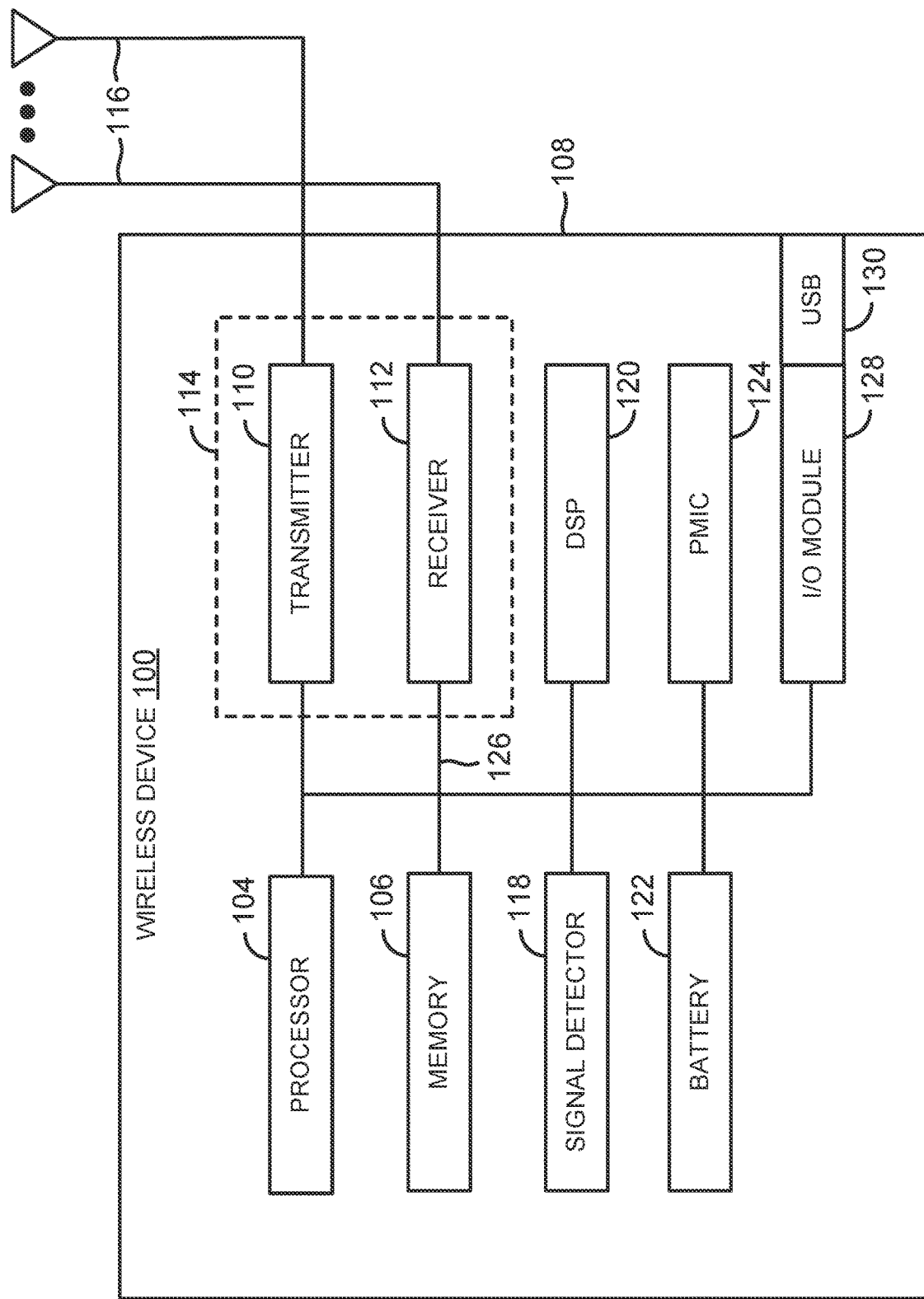
FIG. 1 illustrates a block diagram of an example wireless device that includes linearizing circuitry, according to one implementation.

Implementations of the present disclosure and their advantages are best understood by referring to the detailed description that follows. It should be appreciated that like

DETAILED DESCRIPTION

In one example, a wireless device includes a Universal Serial Bus (USB) Type-C (USB-C) receptacle is used for charging, for high-speed data, and for analog audio signals. For instance, the device may omit a 3.5 mm audio jack in favor of using a USB-C receptacle for physical attachment of a headset or earbuds. An advantage of such devices is that they may use a single chip for USB-C and audio, thereby saving area inside the housing of the device.

However, external wired plugs, such as used in USB-C, may include a risk of overvoltage. For instance, a USB-C cord may build a static charge that may become discharged when the cord is physically mated to the plug. Various implementations include large transistors that, when turned off, isolate internal components from a potential overvoltage condition. For instance, in a device that multiplexes audio, charging, and high-speed data on to a single USB-C plug, such large transistors may electrically isolate an application processor, audio signal amplifiers, charging circuitry, and the like from the plug when those transistors are turned off.

However, those large transistors may create their own challenges during operation. For instance, an audio signal carried on the wires that are coupled to the plug may have an expected range of amplitudes during normal operation. Assuming that a transistor is disposed along the wire from source to drain, the gate-source voltage of the transistor may change as the amplitude of the audio signal changes. As a result, the impedance of the transistor may change, thereby adding non-linearity and distortion to the audio signal.

Various implementations include linearizing circuitry to keep gate-source voltages within an acceptable range during normal operation so as to reduce total harmonic distortion (THD).

In one example, a wireless communication device includes an application processor, a pair of audio signal amplifiers, and a charging integrated circuit (IC) coupled to a set of wires by multiplexing circuitry. A data and audio plug is coupled to the set of wires and to the multiplexing circuitry.

A switch, such as a metal oxide semiconductor field effect transistor (MOSFET) switch, may be disposed on a first wire of the set of wires between the first audio signal amplifier and the data and audio plug. When the MOSFET switch is turned off, it may provide protection from overvoltage conditions at the plug. When the MOSFET switch is turned on, it may conduct amplified audio signals from the audio signal amplifier, through the plug, and to an external load, such as a wired set of headphones.

Linearization may be achieved through use of a gate driving circuit. The gate driving circuit may have an output coupled to the gate of the MOSFET switch. The gate driving circuit may also include a buffer (e.g., implemented as an operational amplifier) having a first buffer input coupled to an output of the first audio signal amplifier. A digital-to-analog converter (DAC) may be disposed between the output of the audio signal amplifier and the first buffer input to provide a gain-adjusted audio signal to the buffer input.

There may also be a direct current (DC) voltage shift circuit at the buffer input. The other buffer input may be arranged with a feedback path on the output of the gate driving circuit to the other buffer input, and the other buffer input may include a DC voltage offset. The result is an output from the gate driving circuit that includes a DC component as well as a gain-adjusted alternating current (AC) component, where the gain-adjusted AC component corresponds to the gain-adjusted audio signal. During an ON state of the transistor, its gate is driven by the DC component and the AC component, where the AC component approximates the audio signal to keep the gate-source voltage of the transistor stable over an operating range of the audio signal.

An advantage of some implementations is high performance. Specifically, keeping a more constant gate-source voltage of the transistor may result in a more constant impedance of the transistor during normal operation. The more constant impedance may lead to a lower value for THD and higher user satisfaction.

Of course, the example above is given for a single audio channel. Some implementations may include multiple (e.g., two) audio channels, and both audio channels may have a transistor and a linearizing circuit to drive that transistor. Furthermore, a ground path between the plug and the ground may have a transistor and a linearizing circuit to drive that transistor. Such implementations are described in more detail below.

FIG. 1 illustrates an example device 100 in which aspects of the present disclosure may be implemented. The device 100 may be a battery-operated device such as a cellular phone, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as direct current (DC)-to-DC conversion, battery charging, power-source selection, voltage scaling, power sequencing, etc. In certain aspects, the PMIC 124 may include a battery charging circuit (e.g., a master-slave battery charging circuit) or other switched-mode power supply. The various components of the device 100 may be coupled together by a bus system 126, which may include a power bus, a control signal bus, and/or a status signal bus in addition to a data bus.

For certain aspects, the device 100 may have an input/output (I/O) module 128 for receiving and/or outputting data and/or power. In certain aspects, the I/O module 128 may include a connector 130, such as a USB Type-A (USB-A) receptacle or a USB-C receptacle. The pins of the connector 130 may be routed to the processor 104 and/or the PMIC 124 via signal lines of the bus system 126 and/or the I/O module 128, at least some of which may include an overvoltage protection circuit, as further described herein. Also, as described herein, the I/O module 128 may include a coder decoder (codec) chip, the codec chip including an audio signal path and drivers, among other hardware components, to facilitate audio through the connector 130.

Figure 2:
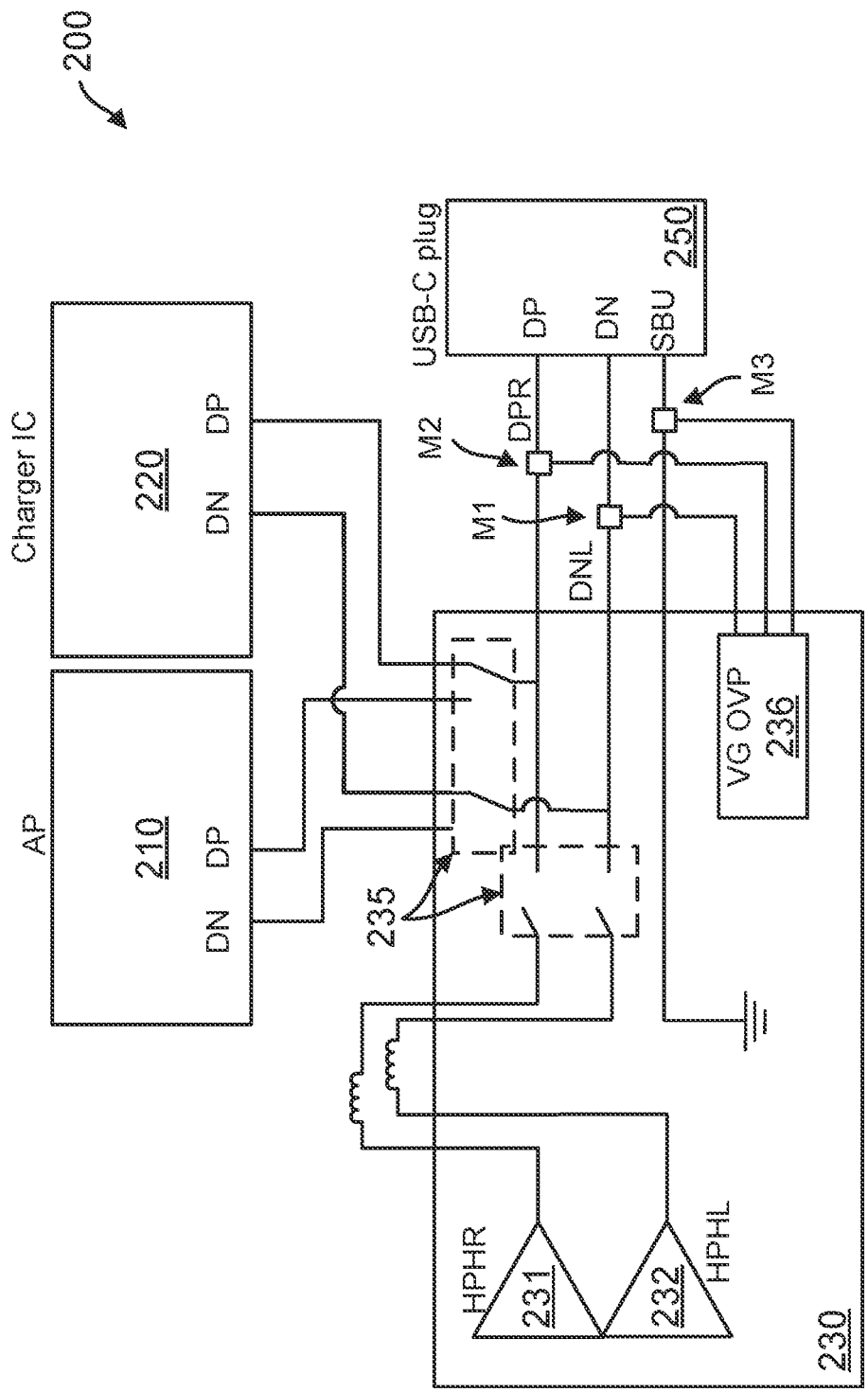
FIG. 2 illustrates an example architecture for multiplexing audio signals, high-speed data signals, and charging in a device such as the device of FIG. 1, according to one implementation.

FIG. 2 is an illustration of example hardware architecture 200, which provides more detail as to how some portions of device 100 may be implemented. For instance, architecture 200 includes application processor 210, which may include some or all of the functionality of processor 104 and DSP 120. In some examples, the application processor 210 may be a system on chip (SOC), which includes multiple processor cores, a digital signal processor (DSP), memory, and the like. For instance, one or more of the processor cores may run an operating system having a kernel that provides functionality for, e.g., controlling the multiplexing circuitry 235 and the VGOVP circuit 236. The architecture 200 also includes the charger integrated circuit 220, which may include some or all of the functionality of PMIC 124.

Codec chip 230 may provide some or all of the functionality of I/O module 128, and also may include connector 130 to physically interface with plug 250. In this example, plug 250 is a USB-C plug, though the scope of implementations may include any appropriate plug, whether conforming to a standard or otherwise. The codec chip 230 interfaces with both an audio signal path and a USB data path. For instance, codec chip 230 receives high-speed data on the DNL and DPR data lines from the USB-C plug 250. The codec chip 230 may then route that high-speed data to the application processor 210.

Additionally, the codec chip includes audio signal amplifiers 231, 232 for the left channel and right channel, respectively. Analog audio signals may be output to the USB-C plug 250 for use by, e.g., a wired headphone. Of note as well, the USB-C plug 250 may be used for charging so that DC power may be provided from the USB-C plug 250 to the charger IC 220.

To facilitate the shared connections, codec chip 230 includes multiplexing circuitry 235, which in FIG. 2 is illustrated as multiple switches. For instance, when audio signals are being transmitted from the audio signal amplifiers 231, 232 to the USB-C plug 250, switches may be turned on to create an electrical path from the audio signal amplifiers 231, 232 to the USB-C plug 250, whereas other switches may be turned off to isolate the application processor 210 from the audio signal path and to isolate the charger IC 220 from the audio signal path as well. Similarly, when the application processor 210 is transmitting and receiving digital data over the DP and DN pins with the USB-C plug 250, the charger IC 220 and the audio signal amplifiers 231, 232 may be isolated from the USB-C plug by the multiplexing circuitry 235. Also, when the charger IC 220 is receiving DC power over the DN and DP pins of the USB-C plug 250, the multiplexing circuitry 235 may create an electrical connection from the charger IC 220 to the USB-C plug 250 while isolating the application processor 210 and the audio signal amplifiers 231, 232 from the DC charging power. The multiplexing circuitry 235 may be controlled, e.g., by the application processor 210 or some other appropriate hardware or software logic within the architecture 200.

Codec chip 230 also includes external transistor linearizer, overvoltage protection and electrostatic discharge circuit 236 (hereinafter, VGOVP circuit 236), which among other things, drives the gates of transistors M1, M2, M3. For instance, VGOVP circuit 236 may turn transistors M1, M2, M3 OFF to electrically isolate codec chip 230, application processor 210, and charger IC 220 from USB-C plug 250. VGOVP circuit 236 may also turn transistors M1, M2, M3 ON and provide linearization to transistors M1, M2, M3 during the ON state.

Figure 3:
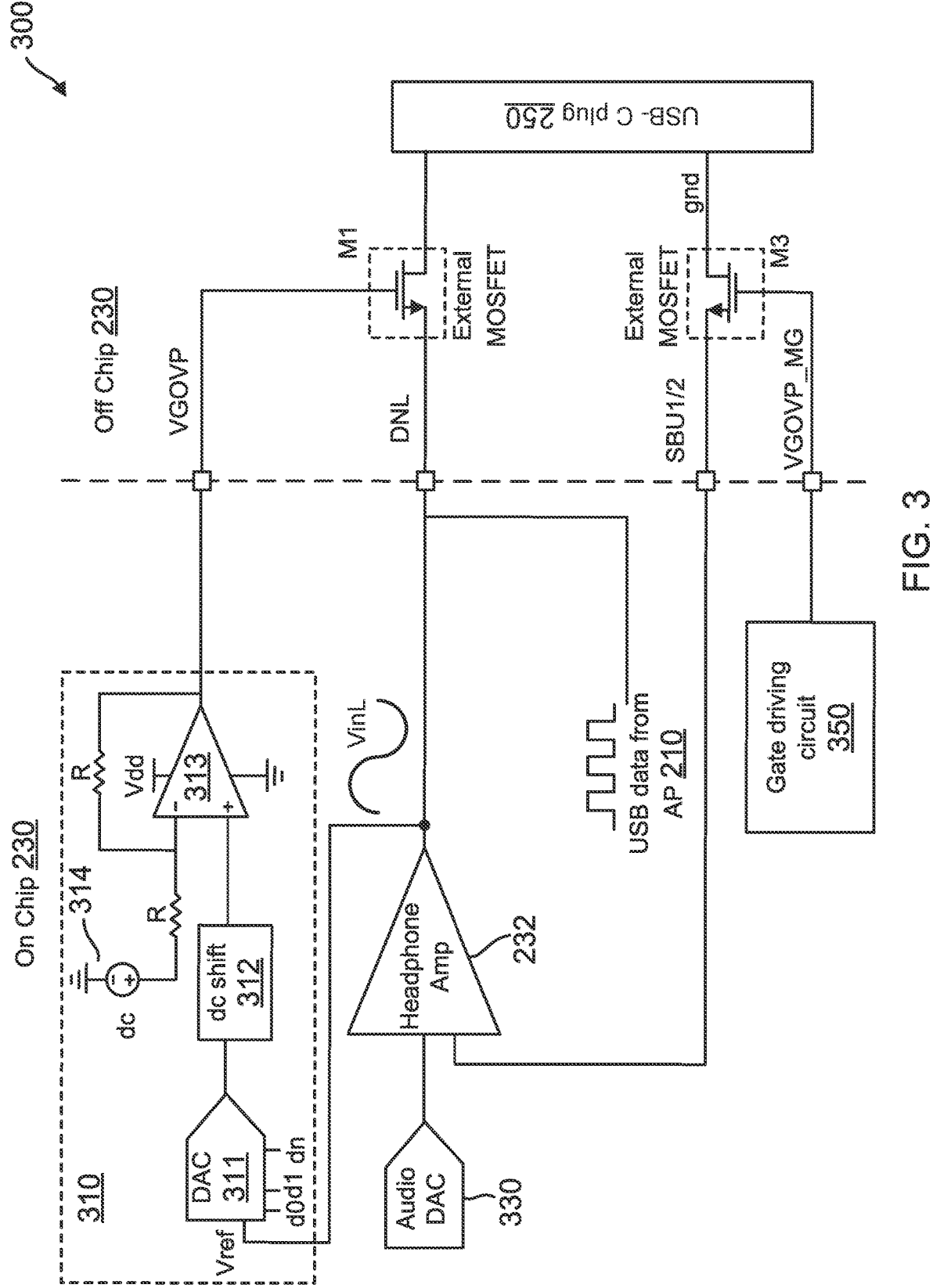
FIG. 3 illustrates an example gate driving circuit or a left audio channel and a ground path, which may also be applied to a right audio channel and is associated with the implementation of FIG. 2.

FIG. 3 illustrates a schematic diagram of an example audio switch linearization architecture 300 in accordance with another aspect of the disclosure. The architecture 300 includes a digital-to-analog converter (DAC) 311, direct current (DC) level shift circuit 312, and a buffer (e.g., an operational amplifier) 313. The DAC reference voltage (Vref) is the audio signal (VinL) from the output of audio signal amplifier 232. In this example, the DAC 311 applies gain factors ($\alpha$ and $\beta$) to the analog audio signal from the output of audio signal amplifier 232. DAC codes (d0,d1 . . . dn) may be used to set the particular gain factors based on digital calculation. Setting the gain factors is described in more detail below with respect to FIG. 7. The voltage VGOVP_L drives the gate of transistor M1.

FIG. 3 focuses on the left channel, corresponding to audio signal amplifier 232, for ease of illustration. It is understood that a similar architecture is applied to the right channel, corresponding to audio signal amplifier 231, to drive the gate of transistor M2. Furthermore, gate driving circuit 350 drives the gate of transistor M3 on the ground path, and while it is shown simplified here, it is described in more detail with respect to FIG. 6. Audio signal amplifier 232 receives an analog audio signal from DAC 330 and provides a level of gain to the analog audio signal sufficient for that audio signal to be applied to a transducer, such as a speaker in a headphone.

Continuing with the example, gate driving circuit 310 includes DAC 311, DC shift circuit 312, and buffer 313. As noted above, DAC 311 receives the analog audio signal VinL from the output of the audio signal amplifier 232. DAC 311 is programmed to apply gain factors ($\alpha$ and $\beta$) to the analog audio signal. The DC shift circuit 312 applies a voltage level shift, and the combined signal having the AC component from the audio signal and the DC component from the DC shift circuit 312 is applied to the non-inverting input of the buffer 313.

The buffer 313 is implemented using an operational amplifier in FIG. 3. There is a feedback path from the output of the gate driving circuit 310 to the inverting input of buffer 313, where that feedback path includes a resistor of value R. There is also a DC voltage applied to the inverting input by DC source 314 and through another resistor of value R.

In the example of architecture 300, the two resistors R coupled to the inverting input of buffer 313 have the same value, which provides a gain value of the buffer 313 of two. However, the scope of implementations is not limited to the resistors having the same value or to a particular gain of the buffer 313. Rather, the scope of implementations includes any appropriate amount of gain for a given application.

When there is no data or audio being transmitted or received, transistors M1, M2, M3 may be turned off by applying voltages at the respective gates sufficient to cause a negative gate-source voltage. On the other hand, when data or audio is being transmitted or received, transistors M1, M2, M3 may be turned ON by applying a gate voltage having a DC component sufficient to turn those transistors ON. Furthermore, during the ON state of transistors M1, M2, M3, the gate voltages may have an AC component sufficient to provide linearization.

FIG. 3 also illustrates a physical arrangement for some implementations. Specifically, in the example of FIG. 3, the audio signal amplifier 232, the gate driving circuit 310, the audio DAC 330, and the gate driving circuit 350 are disposed on the codec chip 230. By contrast, the transistors M1, M2, M3 are disposed off of the codec chip 230. The illustrated physical arrangement may create a situation in which the codec chip 230 only has access to the gates of the transistors M1, M2, M3 and does not have access to other terminals of those transistors. Various implementations described herein may provide an effective lowering of THD even in a physical arrangement, such as in FIG. 3, where gate voltage is the sole variable for adjustment and linearization.

Figure 4:
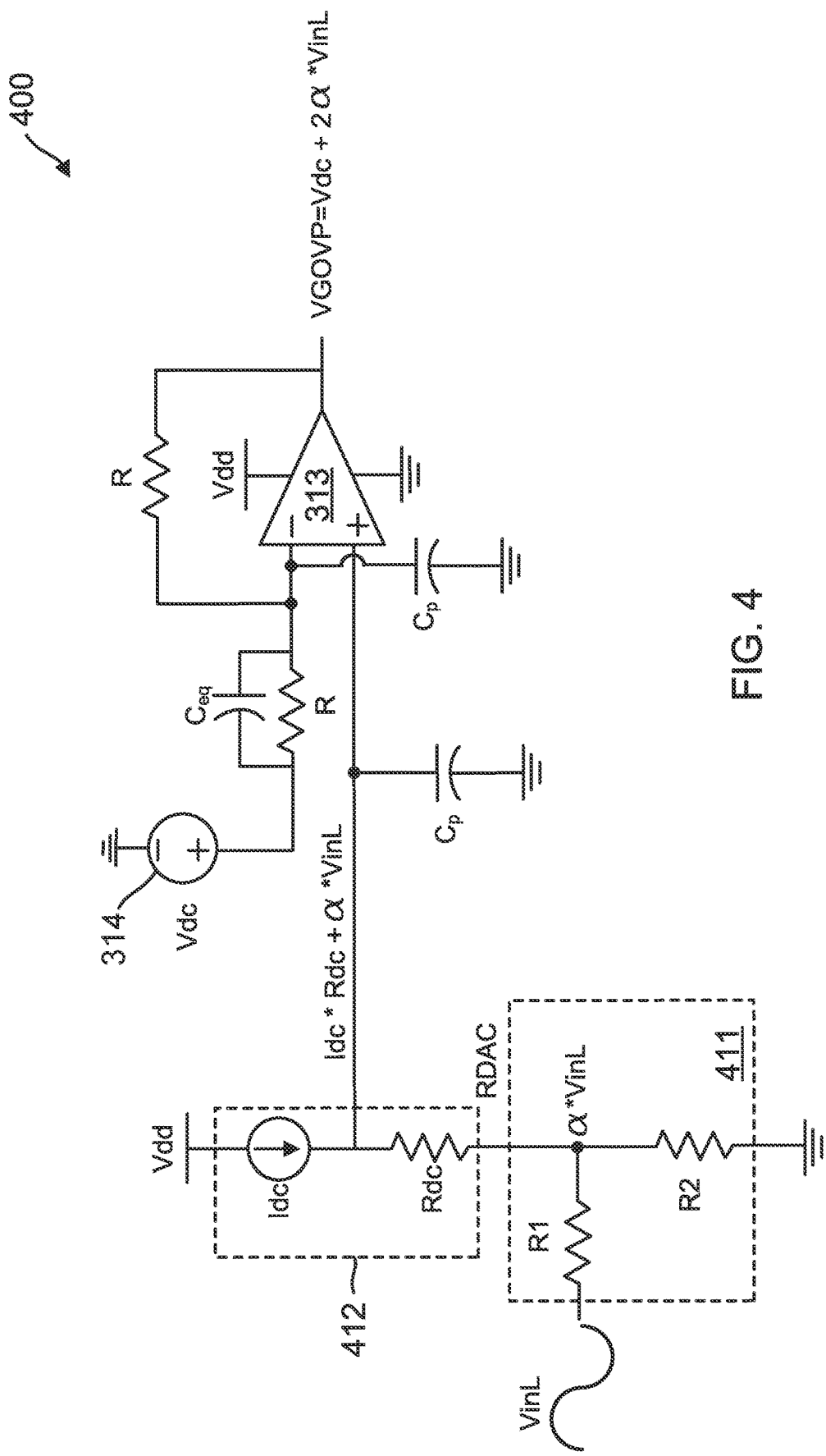
FIG. 4 illustrates an example gate driving circuit, according to one implementation.

FIG. 4 is an illustration of an example gate driving circuit 400, according to one implementation of the present disclosure. Gate driving circuit 400 may be implemented on the left audio channel (as in FIG. 3) or on the right audio channel. A similar structure, described in more detail with respect to FIG. 6, may be used for driving a transistor (e.g., M3) at the ground path.

In the example of gate driving circuit 400, the DAC is implemented as a resistor string DAC (RDAC) 411. Voltage VinL is an analog audio signal from the left audio channel, though as mentioned above, the example gate driving circuit 400 may be implemented on the left audio channel or on the right audio channel. In an instance in which example gate driving circuit 400 is implemented on the right audio channel, the analog audio signal VinR (from the audio signal amplifier 231) would be used.

RDAC 411 corresponds to the DAC 311 of FIG. 3. Put another way, RDAC 411 illustrates one way in which DAC 311 may be designed. RDAC 411 is shown as an equivalent circuit having resistances R1 and R2, where a selected tap point generates a desired gain factor of the AC component ($\alpha$*VinL). The desired tap point may be selected by a DAC code, which is illustrated as (d0,d1 ... dn) in FIG. 3. In fact, the DAC code is the digital input to the DAC 411. The scope of implementations is not limited to an RDAC, as any appropriate DAC architecture may be used.

The gate driving circuit 400 also includes DC shift circuit 412, which corresponds to DC shift circuit 312 of FIG. 3. In other words, DC shift circuit 412 illustrates one way in which DC shift circuit 312 may be designed. In the example of FIG. 4, DC shift circuit 412 may be implemented using a current source Idc and a resistor Rdc disposed between DAC 411 and the non-inverting input of the buffer 313. The DC voltage offset, Vdc, is equal to Idc*Rdc. The scope of implementations is not limited to any particular DC shifting circuitry, as a DC voltage may be added in any appropriate manner.

As a result of the gain produced by RDAC 411 and the DC offset produced by DC shift circuit 412, the voltage level at the non-inverting input of buffer 313 is Idc*Rdc+$\alpha$*VinL.

FIG. 4 illustrates parasitic capacitance Cp at both the inverting input and the noninverting input of the buffer 313. As a result of the parasitic capacitance, there may be a phase delay experienced at the output of gate driving circuit 400 relative to the analog audio signal VinL at the output of audio signal amplifier 232 on the left channel (or audio signal amplifier 233 on the right channel). Various implementations add an equalizing capacitance Ceq in parallel with a resistor at the non-inverting input (between voltage source 314 and the non-inverting input). The equalizing capacitance Ceq may equalize the phase between the output of the gate driving circuit 400 and a respective audio channel. The equalizing capacitance Ceq may be designed in any appropriate manner, though in the particular architecture shown in FIG. 4, minimum phase delay occurs when Equation (1) is satisfied:

$$C_{eq} = C_p \left( \frac{2R_{dc}}{R} - 1 \right). \quad \text{Eq. (1)}$$

In some implementations, the equalizing capacitance Ceq may be variable so that it may be adjusted for a particular application.

The output of the gate driving circuit 400 has a DC component and an AC component. The DC component is Vdc, which is equal to Idc*Rdc and equal to the voltage of voltage source 314. Note that the inverting input of buffer 313 receives its DC voltage component from a resistor divider made up of the two resistances of value R. The AC component of the output is equal to 2*$\alpha$*VinL. As applied to the right audio channel, the AC component of the output would be 2*$\alpha$*VinR. In this implementation, the output voltage VGOVP is applied to a gate of a transistor, such as transistor M1 on the left audio channel or M2 on the right audio channel.

Figure 5:
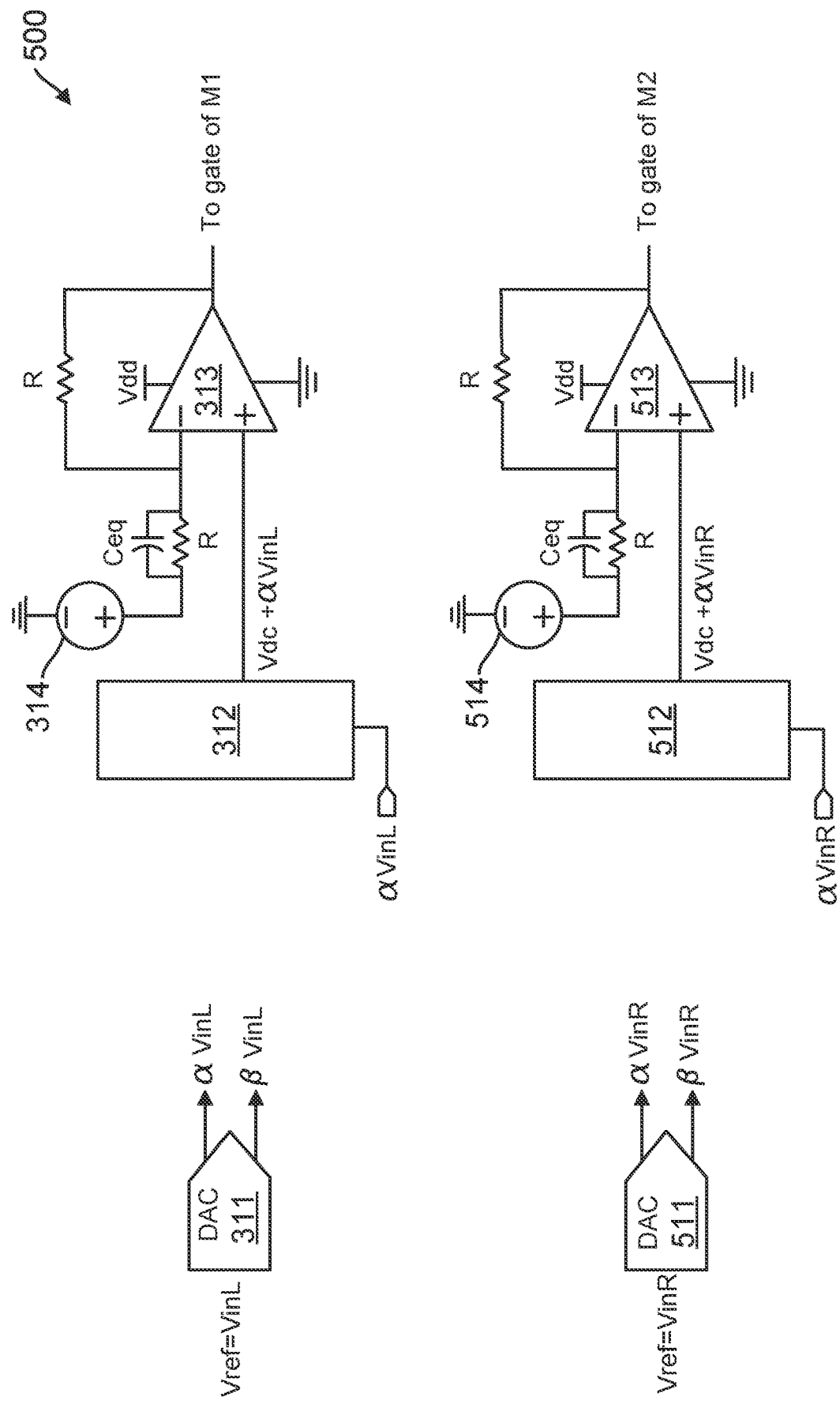
FIG. 5 illustrates an example driving circuit, according to one implementation.
Figure 6:
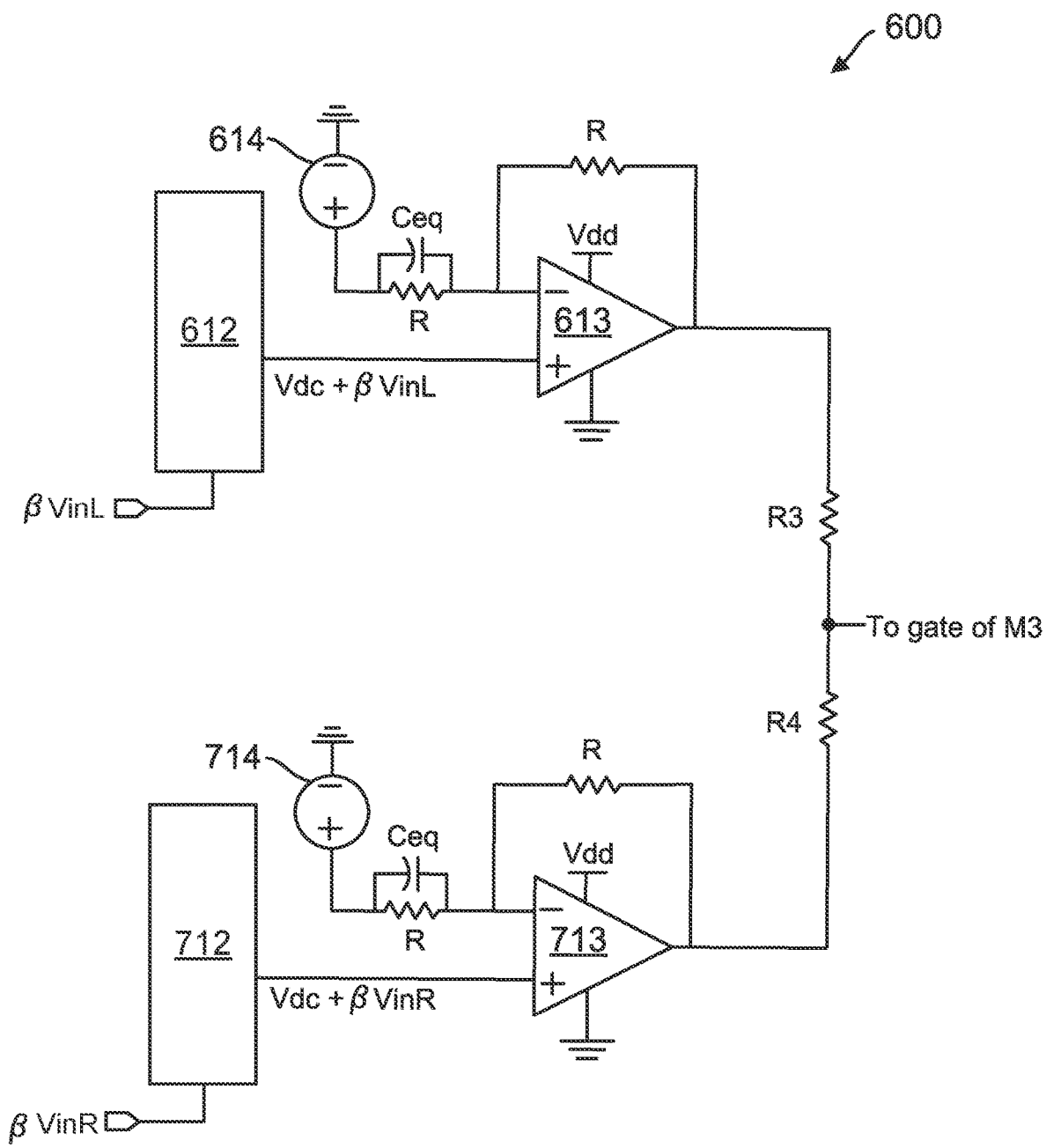
FIG. 6 illustrates an example gate driving circuit, according to one implementation.

FIGS. 5 and 6 illustrate example architectures 500 and 600 to implement gate driving circuits on both the left audio channel, the right audio channel, and a ground path, according to one implementation. DAC 311 receives VinL as its reference voltage, and it outputs a gain-adjusted audio signal $\alpha$*VinL. Further in this example, DAC 311 is a double DAC, having two outputs. The other output is a gain-adjusted audio signal $\beta$*VinL. Further in this example, the gain factors $\alpha$ and $\beta$ may be the same or different, as appropriate for a given application. An example DAC 311 may include two RDACs, one RDAC to output $\alpha$*VinL and another RDAC to output $\beta$*VinL. DAC 511 may be the same as or similar to DAC 311.

DC shift circuit 512 may be the same as or similar to DC shift circuit 312, buffer 513 may be the same as or similar to buffer 313, and voltage source 514 may be the same as or similar to voltage source 314. The output voltage to the gate of transistor M1 is Vdc+2*$\alpha$*VinL, and the output to the gate of transistor M2 is Vdc+2*$\alpha$*VinR.

Architecture 600 may be used to provide a gate voltage to the ground path transistor M3. In contrast to the architecture 500, where the buffers 313, 513 receive gain-adjusted audio signals according to the gain factor $\alpha$, the architecture 600 has buffers 613, 713 receive gain-adjusted audio signals according to the gain factor $\beta$. The gain factors $\alpha$ and $\beta$ may be the same or different and may be chosen to fit a particular application as appropriate. Also, both left and right channels use the same gain level $\alpha$ in this example; however, some implementations may use different gain levels for the left and right channels. In such an example, DAC 311 may apply a gain level of $\alpha_1$ to the left channel, and DAC 511 may apply a gain level of $\alpha_2$ to the right channel, where $\alpha_1$ and $\alpha_2$ are different. Similarly, DAC 311 may apply a gain level of $\beta_1$ to the left channel, and DAC 511 may apply a gain level of $\beta_2$ to the right channel, where $\beta_1$ and $\beta_2$ are different.

DC shift circuits 612, 712 may be the same as or similar to DC shift circuit 312, buffers 613, 713 may be the same as or similar to buffer 313, and voltage sources 614, 714 may be the same as or similar to voltage source 314. The output of buffer 613 is equal to Vdc+2β*VinL, and the output of buffer 713 is equal to Vdc+2β*VinR. The output of buffer 613 and the output of buffer 713 are coupled to the gate of transistor M3 through a resistor divider having the resistors R3 and R4. The values of resistors R3 and R4 may be the same or different. Architecture 600 applies a weighted average of gain-adjusted versions of the left audio channel and the right audio channel to the gate of transistor M3. The weights of the weighted average are set by the values of resistors R3 and R4. In an implementation in which the resistive values of resistors R3 and R4 are the same, the voltage applied to the gate of transistor M3 is Vdc+β(VinL+VinR). In an example in which DAC 311 applies a gain level of $\beta_1$ to the left channel, and DAC 511 applies a gain level of $\beta_2$ to the right channel, the voltage applied to the gate of transistor M3 is Vdc+$\beta_1$(VinL)+$\beta_2$(VinR).

Figure 7:
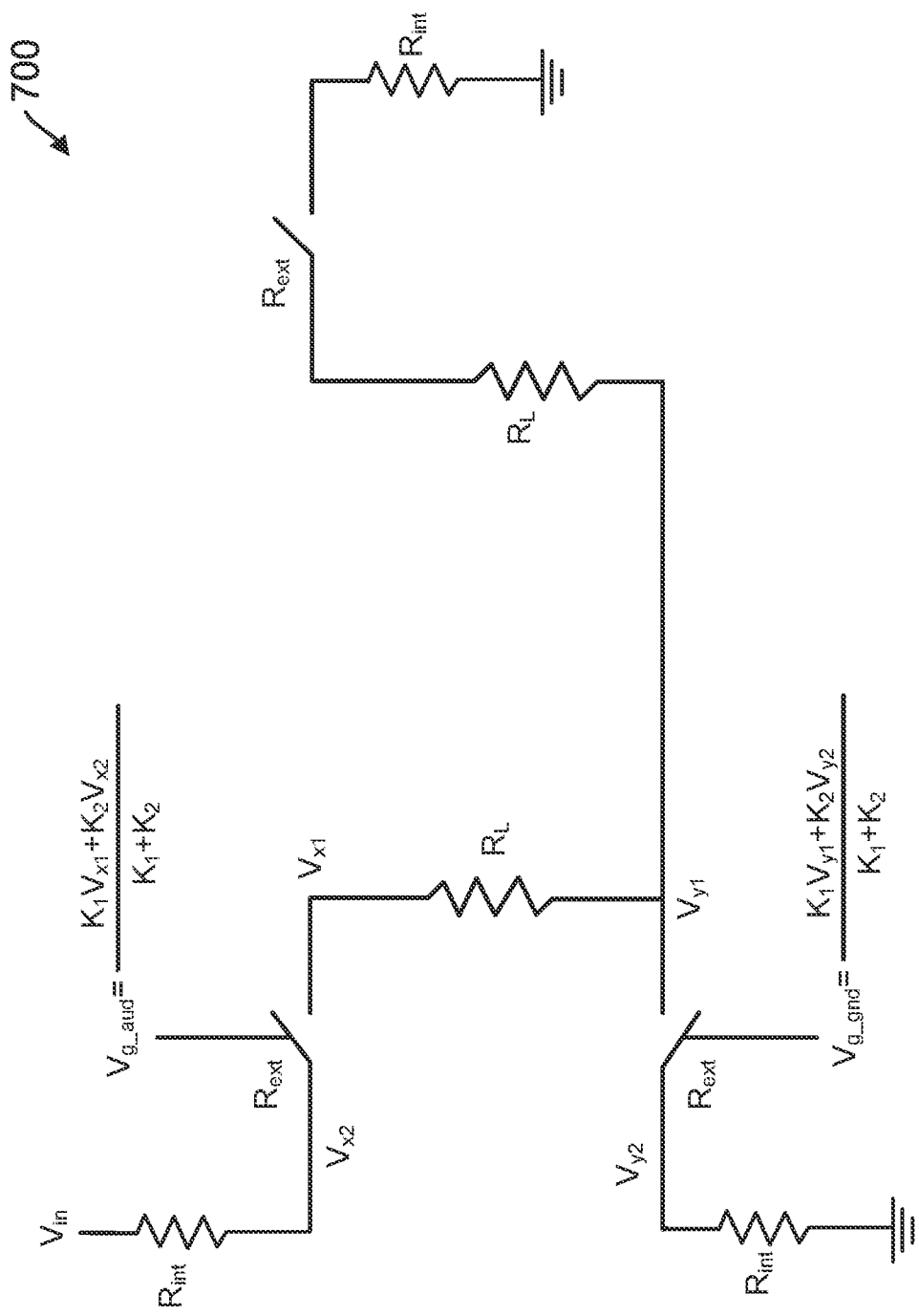
FIG. 7 illustrates an example resistive network, which may be used to model gain factors in the gate driving circuits of FIGS. 2-6.

FIG. 7 illustrates a resistive network 700, according to one example. Specifically, the resistive network 700 is offered to show an example of calculating the gain factors α and β.

In the example of FIG. 7, $R_{ext}$ is a value of the resistance of a given audio-path transistor (e.g., M1 or M2). The voltage $V_{x2}$ is the voltage at the source of an audio-path transistor, and voltage $V_{x1}$ is the voltage at the drain of an audio path transistor. $R_L$ is a value of load resistance, as measured at the USB-C plug 250. $V_{g\_aud}$ is a voltage applied to a gate of an audio-path transistor, and $V_{g\_gnd}$ is a voltage applied to a gate of a ground path transistor (e.g., transistor M3). $V_{in}$ is an AC component from an audio channel, such as VinL or VinR. $K_1$ and $K_2$ are weighting factors that are applied to the drain and source voltages. $R_{int}$ represents a resistance attributable to one or more switches (not shown) on the respective paths and may be disregarded for the calculation below.

The weighting factors $K_1$ and $K_2$ may be set by experimentation and/or simulation to provide adequate levels of THD for a given application. In an example in which $K_1$=3 and $K_2$=1, Equation (2) gives a relationship between $V_{g\_aud}$ and $V_{in}$:

$$V_{g\_aud} = \frac{6R_{ratio}^2 + 13R_{ratio} + 4}{4(3R_{ratio}^2 + 4R_{ratio} + 1)} V_{in} = \quad (\text{Eq. 2})$$

$$\left\{ \frac{R_{ratio}}{1 + 3R_{ratio}} + \frac{(1 + 2R_{ratio})(4 + R_{ratio})}{4(1 + R_{ratio})(1 + 3R_{ratio})} \right\} V_{in},$$

where $R_{ratio}$ is $R_{ext}/R_L$.

Equation (3) gives a relationship between $V_{g\_gnd}$ and $V_{in}$:

$$V_{g\_gnd} = \frac{3R_{ratio}}{4(1 + 3R_{ratio})} V_{in}. \quad (\text{Eq. 3})$$

In one example, the gain factor α may be determined by selecting appropriate values for $K_1$ and $K_2$ consistent with Equation (4):

$$2\alpha V_{inL} = \frac{K_1 V_{X1} + K_2 V_{X2}}{K_1 + K_2}. \quad (\text{Eq. 4})$$

Equation 4 applies to the left audio channel, though it is within the scope of implementations to use VinR from the right audio channel instead of VinL in Equation (4). Similarly, β may be determined by selecting appropriate values for $K_1$ and $K_2$ consistent with Equation (5):

$$\beta(V_{inL} + V_{inR}) = \frac{K_1 V_{Y1} + K_2 V_{Y2}}{K_1 + K_2}. \quad (\text{Eq. 5})$$

In some implementations, the gain factors α and β may be set by digital input to one of the DACs 311, 511, e.g., using the bit sequences (d0,d1 . . . ,dn) to enter values for $K_1$ and $K_2$. It is generally expected that different audio switch transistors, such as the MOSFET transistors shown as M1, M2, M3, may differ from application to application and that appropriate gain factors may also differ from application to application. In other words, a change in a design or a process for one or more of transistors M1, M2, M3 may benefit from determining new gain factors α and β.

Various implementations may include advantages over other solutions. For instance, the gate driving circuit implementations described above with respect to FIGS. 3-7 may provide a more precise level of linearization for the transistors M1, M2, M3 by using DACs to provide gain to an audio channel signal. Particular DACs may be selected for an appropriate level of precision to meet a THD constraint for a given application. As a result, levels of THD may be lowered or at least kept within an acceptable range by digital input to the DACs. The DACs may be configured to receive digital input from a computing resource, such as an application processor, which may monitor distortion and adjust as needed and/or perform calibration at startup.

Figure 8:
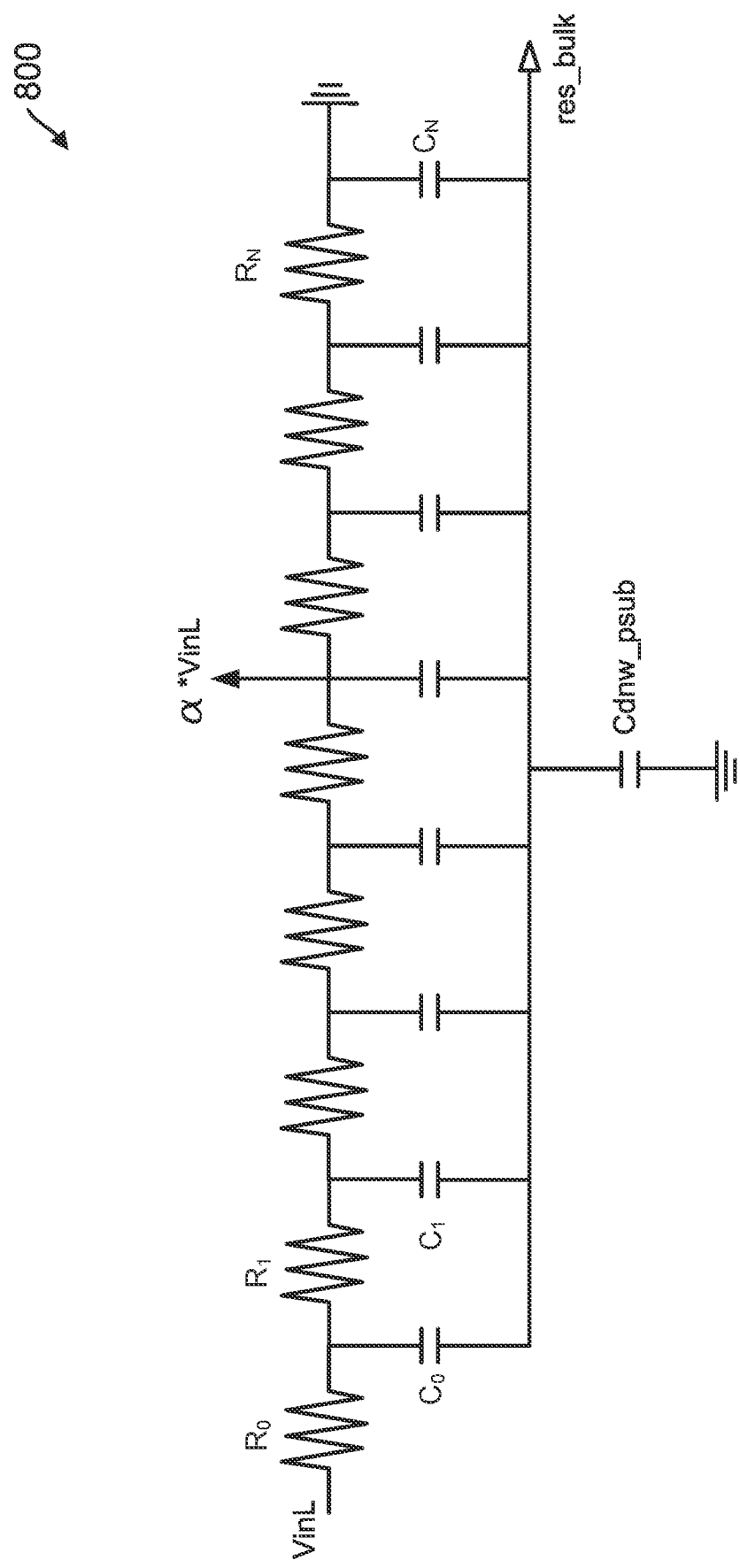
FIG. 8 illustrates an example digital-to-analog converter (DAC), which may be used with the example gate driving circuits of FIGS. 2-6.

FIG. 8 illustrates an example resistor string 800 that may be used in a DAC, such as RDAC 411 of FIG. 4, according to one implementation. Once again, FIG. 8 shows how a resistor string 800 may be applied to the left audio channel to receive an input voltage VinL, and the scope of implementations includes other resistor strings receiving other audio channel input voltages, such as VinR.

RDAC devices, such as RDAC 411, may have an equivalent capacitance to bulk when they are built on a semiconductor substrate. The equivalent capacitance to bulk makes the resistive network of the resistor string 800 perform like a transmission line, and that may create phase lag. An example is shown in FIG. 8 in which a multitude of resistors $R_0$ . . . $R_N$ are arranged in a string, and the equivalent capacitance to bulk is illustrated by the capacitors $C_0$ . . . $C_N$ and $C_{dnw\_psub}$.

Various implementations herein may reduce or eliminate phase lag from an RDAC implementation by coupling the bulk of resistor (res_bulk) to the input VinL. Specifically, the bulk of resistor res_bulk may correspond to the semiconductor substrate or the semiconductor well under the resistor res_bulk, and some implementations may tie the input voltage VinL to the semiconductor substrate or well, as illustrated in FIG. 8. Reducing the phase lag may result in lower THD.

An example method for operating a wireless communication device having a first MOSFET switch implemented between a first audio signal amplifier and an audio load will now be discussed with reference to the flowchart shown in FIG. 9. The method 900 may be performed by a hardware architecture, such as is illustrated in FIG. 2, as it receives and transmits audio signals on transmission lines. For instance, the hardware architecture may include one or more high-speed data transmission lines (e.g., DPR and DNL) that are configured for transmitting audio signals and are coupled with multiplexing circuitry (e.g., multiplexing circuitry 235) and audio signal amplifiers (e.g., audio signal amplifiers 231, 232). The actions of the method 900 may be performed under control of logic, such as may be implemented in a kernel of application processor 210 or under control of other suitable computing circuitry.

At action 910, the method includes isolating the first audio signal amplifier from the audio load. Action 910 may include applying a first gate control signal to the first MOSFET switch at a first voltage level at turns off the first MOSFET switch. For instance, gate driver circuit 310 may output a low voltage to transistor M1, thereby turning off transistor M1 and isolating audio signal amplifier 232 from USB-C plug 250.

Similarly, action 910 may include isolating other audio signal amplifiers, such as isolating audio signal amplifier 231 from USB-C plug 250 by applying a low voltage to the gate of transistor M2 by action of the gate driver circuit including buffer 513. Action 910 may also include turning off a transistor in a ground path, such as by applying a low voltage to the gate of transistor M3 by action of the gate driver circuits including buffers 613, 713.

At action 920, the method includes linearizing the first MOSFET switch, including applying the first gate control signal to the first MOSFET switch at a second voltage level during an ON state of the first MOSFET switch. An example of action 920 includes the gate driving circuit 310 of FIG. 3 applying a gate control signal to transistor M1, where the gate control signal includes a DC voltage (Vdc) sufficient to turn transistor M1 ON and an AC component ($2*\alpha*VinL$) to linearize the operation of transistor M1 during the ON state.

Consistent with the examples of FIGS. 3-7, the AC component may be generated at least in part by a DAC that applies a first gain level to the output of the first audio signal amplifier. In the example of FIG. 4, the gain level is $\alpha$ for the left audio channel.

At action 930, the method includes linearizing other MOSFET switches as well. For instance, on the right audio channel, the gain level $\alpha$ may be applied by a DAC to produce an AC component that is applied at the gate of transistor M2. At the ground path, the gain level $\beta$ may be applied to both audio channels by use of other DACs to produce an AC component that is applied at the gate of transistor M3, as in FIG. 6.

Actions 920-930 may be performed when those transistors M1, M2, M3 are turned ON and when the set of wires DPR, DNL conduct analog audio signals from audio signal amplifiers. As a result, the impedances of the transistors M1, M2, M3 may be held to be approximately constant over the ranges of the audio signals.

At action 940, the MOSFET switches are returned to an OFF state. For instance, the respective gate driving circuits may apply the gate control signals to the transistors M1, M2, M3 at voltage levels sufficient to cause negative gate-source voltages at those transistors. Action 940 may be performed when the set of wires DPR, DNL are not used to conduct analog audio signals from audio signal amplifiers or when the MOSFET switches are used to protect internal codec circuits from damage.

Figure 9:
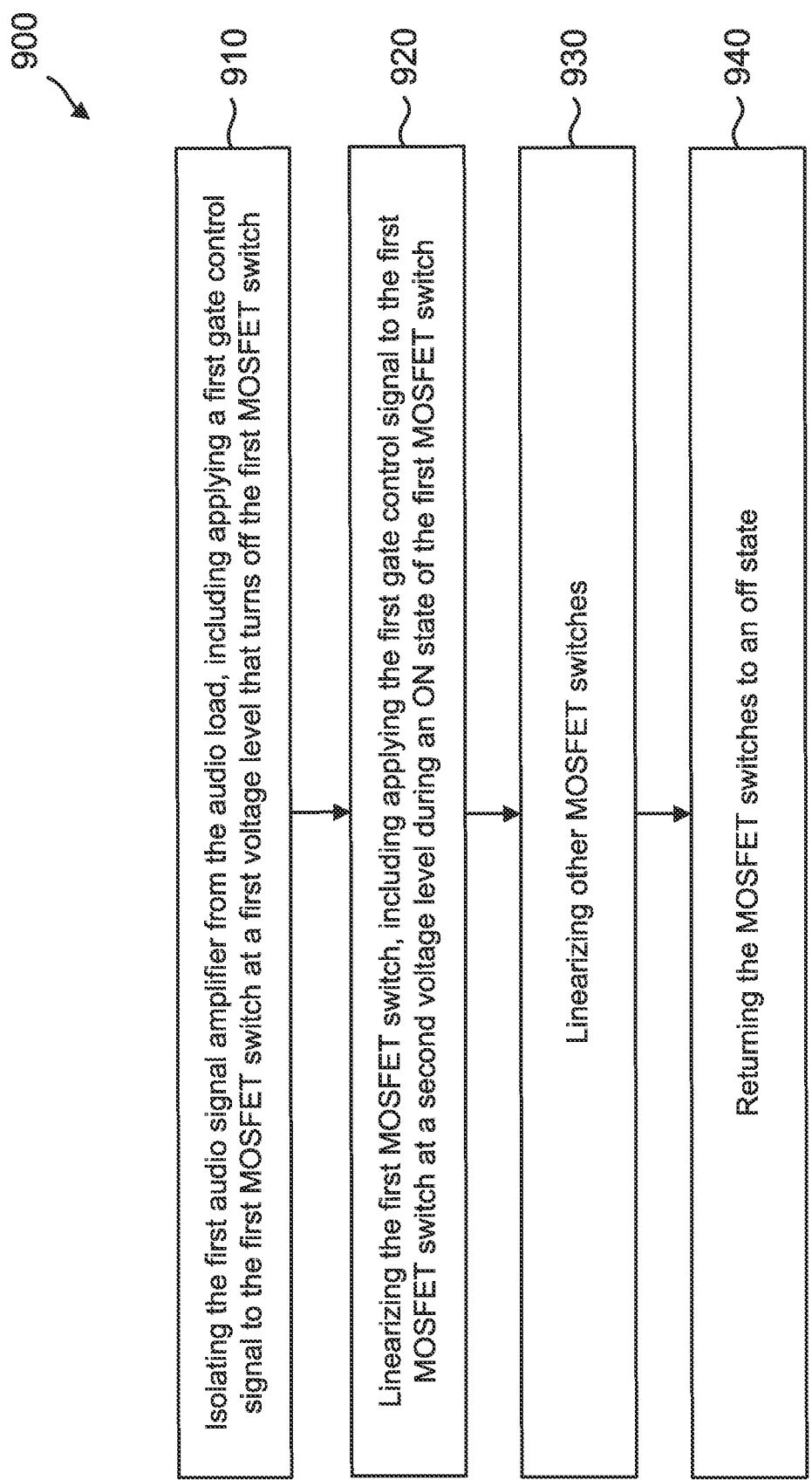
FIG. 9 illustrates a flowchart of an example method that may be performed by the example architecture of FIG. 2.

The scope of implementations is not limited to the series of actions described with respect to FIG. 9. Rather, the actions 910-940 may be repeated as often as appropriate, dependent upon when wired audio capabilities are in use or not in use.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Implementation examples are described in the following numbered clauses:

1. A wireless communication device comprising:
    an application processor;
    a first audio signal amplifier;
    multiplexing circuitry configured to couple the application processor and the first audio signal amplifier to a set of wires;
    a data and audio plug coupled to the set of wires;
    a first metal oxide semiconductor field effect transistor (MOSFET) switch disposed on a first wire of the set of wires between the first audio signal amplifier and the data and audio plug; and
    a first gate driving circuit having an output coupled to a gate of the first MOSFET switch, the first gate driving circuit including a first buffer having a first buffer input coupled to an output of the first audio signal amplifier through a first digital-to-analog converter (DAC).
2. The wireless communication device of clause 1, wherein the first audio signal amplifier corresponds to a first audio channel, and wherein the wireless communication device further comprises:
    a second audio signal amplifier corresponding to a second audio channel;
    a second MOSFET switch disposed on a second wire of the set of wires between the second audio signal amplifier and the data and audio plug; and
    a second gate driving circuit having an output coupled to a gate of the second MOSFET switch, the second gate driving circuit including a second buffer having a second buffer input coupled to an output of the second audio signal amplifier through a second DAC.
3. The wireless communication device of clause 2, further comprising:
    a third MOSFET switch disposed on a third wire of the set of wires between a ground and the data and audio plug; and
    a third gate driving circuit having an output coupled to a gate of the third MOSFET switch, the third gate driving circuit including a third buffer having a third buffer input coupled to the output of the first audio signal amplifier through the first DAC; and
    a fourth gate driving circuit having an output coupled to the gate of the third MOSFET switch, the fourth gate driving circuit including a fourth buffer having a fourth buffer input coupled to the output of the second audio signal amplifier through the second DAC.
4. The wireless communication device of clause 3, wherein the gate of the third MOSFET switch is coupled to the output of the third gate driving circuit and to the output of the fourth gate driving circuit through a resistor divider.
5. The wireless communication device of clause 3, wherein the first DAC is configured to apply a gain of $\alpha$ to the output of the first audio signal amplifier, and wherein the first DAC is configured to apply a gain of β to the output of the first audio signal amplifier, wherein α and β are different values,
further wherein the second DAC is configured to apply the gain of α to the output of the second audio signal amplifier, and wherein the second DAC is configured to apply the gain of β to the output of the second audio signal amplifier, and
further wherein the first buffer is configured to receive the output of the first audio signal amplifier at the gain of α, the second buffer is configured to receive the output of the second audio signal amplifier at the gain of α, the third buffer is configured to receive the output of the first audio signal amplifier at the gain of β, and the fourth buffer is configured to receive the output of the second audio signal amplifier at the gain of β.

6. The wireless communication device of any of clauses 1-5, wherein the first buffer has a fifth buffer input coupled to a direct current (DC) voltage source, wherein the output of the first gate driving circuit is coupled to the fifth buffer input.

7. The wireless communication device of clause 6, wherein the fifth buffer input is coupled to the DC voltage source by a first resistor, wherein the first resistor is coupled in parallel with a first capacitor, and wherein the fifth buffer input is coupled to the output of the first gate driving circuit by a second resistor, further wherein the first buffer input is a non-inverting input, and wherein the fifth buffer input is an inverting input.

8. The wireless communication device of any of clauses 1-7, wherein the first gate driving circuit further includes a direct current (DC) voltage shifting circuit between the first DAC and the first buffer input.

9. The wireless communication device of any of clauses 1-8, wherein the data and audio plug comprises a universal serial bus (USB) plug.

10. The wireless communication device of any of clauses 1-9, further comprising:
a coder decoder (codec) chip that includes the set of wires, the first audio signal amplifier, and the multiplexing circuitry, and wherein the first MOSFET switch is disposed off of the codec chip.

11. The wireless communication device of any of clauses 1-10, wherein the first DAC comprises a resistor string DAC (RDAC) built on a semiconductor substrate, and wherein a signal input of the first DAC is coupled to a bulk of resistor of the semiconductor substrate.

12. A method for operating wireless communication device having a first metal oxide semiconductor (MOSFET) switch implemented between a first audio signal amplifier and an audio load, the method comprising:
isolating the first audio signal amplifier from the audio load, including applying a first gate control signal to the first MOSFET switch at a first voltage level that turns off the first MOSFET switch; and
linearizing the first MOSFET switch, including applying the first gate control signal to the first MOSFET switch at a second voltage level during an ON state of the first MOSFET switch, wherein linearizing the first MOSFET switch includes applying an output of the first audio signal amplifier as a reference voltage to a first digital-to-analog converter (DAC), wherein the first DAC applies a first gain level to the output of the first audio signal amplifier, and wherein a first amplifier receives the output of the first audio signal amplifier at the first gain level, and wherein the first amplifier outputs the first gate control signal to the first MOSFET switch.

13. The method of clause 12, wherein the wireless communication device further has a second MOSFET switch implemented between a second audio signal amplifier and the audio load, the method further comprising:
linearizing the second MOSFET switch, including applying a second gate control signal to the second MOSFET switch during an ON state of the second MOSFET switch, wherein linearizing the second MOSFET switch includes applying an output of the second audio signal amplifier as a reference voltage to a second DAC, wherein the second DAC applies the first gain level to the output of the second audio signal amplifier, and wherein a second amplifier receives the output of the second audio signal amplifier at the first gain level, and wherein the second amplifier outputs the second gate control signal to the second MOSFET switch.

14. The method of clause 13, wherein the wireless communication device further has a third MOSFET switch implemented between the audio load and ground and has a fourth MOSFET switch implemented between the audio load and ground the method further comprising:
linearizing the third MOSFET switch, including:
applying a third gate control signal to the third MOSFET switch during an ON state of the third MOSFET switch, wherein the first DAC applies a second gain level to the output of the first audio signal amplifier, and wherein a third amplifier receives the output of the first audio signal amplifier at the second gain level, and wherein the third amplifier outputs the third gate control signal to the third MOSFET switch through a resistor divider; and
wherein the second DAC applies the second gain level to the output of the second audio signal amplifier, and wherein a fourth amplifier receives the output of the second audio signal amplifier at the second gain level, and wherein the fourth amplifier outputs the third gate control signal to the third MOSFET switch through the resistor divider.

15. The method of any of clauses 12-14, wherein the first audio signal amplifier corresponds to a first audio channel, and wherein the second audio signal amplifier corresponds to a second audio channel.

16. The method of any of clauses 12-15, wherein the audio load is coupled to the first MOSFET switch through a universal serial bus (USB) plug and wherein a second audio load is coupled to the second MOSFET switch through the USB plug.

17. A wireless communication device comprising:
means for running an operating system;
means for amplifying analog audio signals;
means for coupling the means for running the operating system and the means for amplifying analog audio signals to a set of wires;
a data and audio plug coupled to the set of wires;
a first transistor coupled between the data and audio plug and the means for amplifying analog audio signals; and
means for linearizing operation of the first transistor, the means for linearizing operation of the first transistor including a first digital-to-analog converter (DAC) configured to receive a first audio signal from the means for amplifying analog audio signals and outputting the first audio signal having a first gain level to a first amplifier, wherein the first amplifier is coupled to a gate of the first transistor.

18. The wireless communication device of clause 17, wherein the data and audio plug comprises a universal serial bus (USB) plug.

19. The wireless communication device of any of clauses 17-18, further comprising: a coder decoder (codec) chip that includes the set of wires, the means for amplifying analog audio signals, and the means for coupling, and wherein the first transistor is disposed off of the codec chip.

20. The wireless communication device of any of clauses 17-18, wherein the first DAC comprises a resistor string DAC (RDAC) built on a semiconductor substrate, and wherein a signal input of the first DAC is coupled to a bulk of resistor of the semiconductor substrate.

21 The wireless communication device of any of clauses 17-18, further comprising:
a second transistor coupled between the data and audio plug and the means for amplifying analog audio signals; and
means for linearizing operation of the second transistor, the means for linearizing operation of the second transistor including a second DAC configured to receive a second audio signal from the means for amplifying analog audio signals and outputting the second audio signal having the first gain level to a second amplifier, wherein the second amplifier is coupled to a gate of the second transistor.

22. The wireless communication device of clause 21, further comprising:
a third transistor coupled between the data and audio plug and ground; and
means for linearizing operation of the third transistor, the means for linearizing operation of the third transistor including:
a third amplifier configured to receive the first audio signal having a second gain level from the first DAC, wherein the third amplifier is coupled to a gate of the third transistor; and
a fourth amplifier configured to receive the second audio signal having the second gain level from the second DAC, wherein the fourth amplifier is coupled to a gate of the third transistor.

23. The wireless communication device of clause 22, wherein the third amplifier and the fourth amplifier are coupled to the gate of the third transistor through a resistor divider.

24. A wireless communication device comprising:
an application processor;
a pair of audio signal amplifiers corresponding to a first audio channel and a second audio channel;
a coder decoder (codec) chip having multiplexing circuitry configured to couple the application processor and the pair of audio signal amplifiers to a set of wires;
a plug coupled to the set of wires;
a first switch coupled between the application processor and the plug on a first wire of the set of wires; and
a first gate driving circuit having an output coupled to a gate of the first switch, the first gate driving circuit including a first buffer having a first buffer input coupled to the first audio channel through a first digital-to-analog converter (DAC).

25. The wireless communication device of clause aim 24, wherein the first switch is disposed off of the codec chip.

26. The wireless communication device of any of clauses 24-25, further comprising: a second switch disposed on a second wire of the set of wires between the application processor and the data and audio plug; and a second gate driving circuit having an output coupled to a gate of the second switch, the second gate driving circuit including a second buffer having a second buffer input coupled to the second audio channel through a second DAC.

27 The wireless communication device of clause 26, further comprising:
a third switch disposed on a third wire of the set of wires between a ground and the data and audio plug; and
a third gate driving circuit having an output coupled to a gate of the third switch, the third gate driving circuit including a third buffer having a third buffer input coupled to the first audio channel through the first DAC.
a fourth gate driving circuit having an output coupled to the gate of the third switch, the fourth gate driving circuit including a fourth buffer having a fourth buffer input coupled to the second audio channel through the second DAC.

28. The wireless communication device of clause 27, wherein the third buffer and the fourth buffer are coupled to the gate of the third switch by a resistor divider.

29 The wireless communication device of clause 27, wherein the first DAC is configured to apply a gain of α to the first audio channel, and wherein the first DAC is configured to apply a gain of β to the output of the first audio channel, wherein α and β are different values,
further wherein the second DAC is configured to apply the gain of α to the second audio channel, and wherein the second DAC is configured to apply the gain of β to the second audio channel, and
further wherein the first buffer is configured to receive the first audio channel at the gain of α, the second buffer is configured to receive the second audio channel at the gain of α, the third buffer is configured to receive the first audio channel at the gain of β, and the fourth buffer is configured to receive the second audio channel at the gain of β.

30 The wireless communication device of clause 29, wherein the plug comprises a universal serial bus (USB) plug.

What is claimed is:
1. A wireless communication device comprising:
an application processor;
a first audio signal amplifier;
multiplexing circuitry configured to couple the application processor and the first audio signal amplifier to a set of wires;
a data and audio plug coupled to the set of wires;
a first metal oxide semiconductor field effect transistor (MOSFET) switch disposed on a first wire of the set of wires between the first audio signal amplifier and the data and audio plug; and a first gate driving circuit having an output coupled to a gate of the first MOSFET switch, the first gate driving circuit including:
a first buffer amplifier having a first input coupled to an output of the first audio signal amplifier through a first digital-to-analog converter (DAC) and having a second input coupled to an output of the first gate driving circuit and coupled to a direct current (DC) voltage source.

2. The wireless communication device of claim 1, wherein the first audio signal amplifier corresponds to a first audio channel, and wherein the wireless communication device further comprises:
a second audio signal amplifier corresponding to a second audio channel;
a second MOSFET switch disposed on a second wire of the set of wires between the second audio signal amplifier and the data and audio plug; and
a second gate driving circuit having an output coupled to a gate of the second MOSFET switch, the second gate driving circuit including a second buffer amplifier having a first input coupled to an output of the second audio signal amplifier through a second DAC and having a second input coupled to an output of the second gate driving circuit.

3. The wireless communication device of claim 2, further comprising:
a third MOSFET switch disposed on a third wire of the set of wires between a ground and the data and audio plug; and
a third gate driving circuit having an output coupled to a gate of the third MOSFET switch, the third gate driving circuit including a third buffer amplifier having a first input coupled to the output of the first audio signal amplifier through the first DAC and having a second input coupled to the output of the third gate driving circuit; and
a fourth gate driving circuit having an output coupled to the gate of the third MOSFET switch, the fourth gate driving circuit including a fourth buffer amplifier having a first input coupled to the output of the second audio signal amplifier through the second DAC and having a second input coupled to an output of the fourth gate driving circuit.

4. The wireless communication device of claim 3, wherein the gate of the third MOSFET switch is coupled to the output of the third gate driving circuit and to the output of the fourth gate driving circuit through a resistor divider.

5. The wireless communication device of claim 3, wherein the first DAC is configured to apply a gain of a to the output of the first audio signal amplifier, and wherein the first DAC is configured to apply a gain of β to the output of the first audio signal amplifier, wherein α and β are different values, and
further wherein the second DAC is configured to apply the gain of a to the output of the second audio signal amplifier, and wherein the second DAC is configured to apply the gain of β to the output of the second audio signal amplifier.

6. The wireless communication device of claim 1, wherein the second input of the first buffer amplifier is coupled to the DC voltage source through a first resistor, wherein the first resistor is coupled in parallel with a first capacitor, and wherein the output of the first gate driving circuit is coupled to the second input of the first buffer amplifier through a second resistor, and further wherein the first input of the first buffer amplifier is a non-inverting input, and wherein the second input of the first buffer amplifier is an inverting input.

7. The wireless communication device of claim 1, wherein the first gate driving circuit further includes a direct current (DC) voltage shifting circuit coupled between the first DAC and the first input of the first buffer amplifier.

8. The wireless communication device of claim 1, wherein the data and audio plug comprises a universal serial bus (USB) plug.

9. The wireless communication device of claim 1, further comprising:
a coder decoder (codec) chip that includes the set of wires, the first audio signal amplifier, and the multiplexing circuitry, and wherein the first MOSFET switch is disposed off of the codec chip.

10. The wireless communication device of claim 1, wherein the first DAC comprises a resistor string DAC (RDAC) built on a semiconductor substrate, and wherein a signal input of the first DAC is coupled to a bulk of resistor of the semiconductor substrate.

11. A wireless communication device comprising:
an application processor;
a pair of audio signal amplifiers corresponding to a first audio channel and a second audio channel;
a coder decoder (codec) chip having multiplexing circuitry configured to couple the application processor and the pair of audio signal amplifiers to a set of wires;
a plug coupled to the set of wires;
a first switch coupled between the application processor and the plug on a first wire of the set of wires; and
a first gate driving circuit having an output coupled to a gate of the first switch, the first gate driving circuit including a first buffer amplifier having a first input coupled to the first audio channel through a first digital-to-analog converter (DAC) and having a second input coupled to the output of the first gate driving circuit and coupled to a direct current (DC) voltage source.

12. The wireless communication device of claim 11, wherein the first switch is disposed off of the codec chip.

13. The wireless communication device of claim 11, further comprising:
a second switch disposed on a second wire of the set of wires between the application processor and the plug; and
a second gate driving circuit having an output coupled to a gate of the second switch, the second gate driving circuit including a second buffer amplifier having a first input coupled to the second audio channel through a second DAC and having a second input coupled to the output of the second gate driving circuit.

14. The wireless communication device of claim 13, further comprising:
a third switch disposed on a third wire of the set of wires between a ground and the plug;
a third gate driving circuit having an output coupled to a gate of the third switch, the third gate driving circuit including a third buffer amplifier having a first input coupled to the first audio channel through the first DAC; and
a fourth gate driving circuit having an output coupled to the gate of the third switch, the fourth gate driving circuit including a fourth buffer amplifier having a first input coupled to the second audio channel through the second DAC.

15. The wireless communication device of claim 14, wherein the third buffer amplifier and the fourth buffer amplifier are coupled to the gate of the third switch by a resistor divider.

16. The wireless communication device of claim 14, wherein the first DAC is configured to apply a gain of $\alpha$ to the first audio channel, and wherein the first DAC is configured to apply a gain of $\beta$ to the output of the first audio channel, wherein $\alpha$ and $\beta$ are different values,
   further wherein the second DAC is configured to apply the gain of $\alpha$ to the second audio channel, and wherein the second DAC is configured to apply the gain of $\beta$ to the second audio channel.

17. The wireless communication device of claim 16, wherein the plug comprises a universal serial bus (USB) plug.

* * * * *